May 1, 1956  S. B. COHN  2,744,242
WAVE GUIDE DELAY LINE
Filed Jan. 4, 1950  2 Sheets-Sheet 1

INVENTOR
SEYMOUR B. COHN
BY
Paul B. Hunter
ATTORNEY

May 1, 1956  S. B. COHN  2,744,242
WAVE GUIDE DELAY LINE
Filed Jan. 4, 1950  2 Sheets-Sheet 2

INVENTOR
SEYMOUR B. COHN
BY
Paul B. Hunter
ATTORNEY

United States Patent Office 2,744,242
Patented May 1, 1956

2,744,242

WAVE GUIDE DELAY LINE

Seymour B. Cohn, Flushing, N. Y., assignor to Sperry Rand Corporation, a corporation of Delaware Application January 4, 1950, Serial No. 136,721

1 Claim. (Cl. 333—31)

This invention pertains to ultra high frequency wave guides and more particularly to wave guide delay lines having good power capacity and voltage breakdown characteristics.

A general discussion of wave guide delay structure is given in "The theory of corrugated transmission lines and wave guides" by H. Goldstein, Radiation Lab Report No. 494, M. I. T., April 3, 1944.

A wave guide delay line may be defined as one in which the guide wavelength is smaller than that of a uniform guide having the same cutoff frequency. This result may be achieved by loading the wave guide with a series of fins or capacitative shunt susceptances along the line. Delay lines are useful, for instance, in the design of linear antenna arrays where a change of beam angle with frequency is desired.

It has been shown in the prior art that wave guide delay lines may be composed of a series of parallel plate capacitative irises. This structure comprises a series of parallel plates perpendicular to the sides of the wave guides and contiguous the wide dimensions of the wave guide. The structure is amenable to filter analysis, see my papers "Analysis of the metal strip delay structure for microwave lenses," Journal of Applied Physics, March 1949 and "Analysis of wide-band wave guide filter," Proceedings of the I. R. E., June 1949.

One of the disadvantages of using this type structure is that it greatly lowers the voltage breakdown characteristic of the wave guide and thereby limits the power transmission. The maximum volage permissible is decreased because of the sharp corners of the structure, and because the narrow dimension of the guide, across which the electric vectors exist, is effectively decreased proportionally to the depth of the parallel plates. Breakdown between elements must also be considered.

The present invention provides a parallel plate delay line which has improved voltage breakdown characteristics. The structure of the present invention comprises the parallel plates, previously discussed, and the addition of rod members along the bottom edge of the parallel plates. The rod members avoid sharp projections at the point of greatest voltage intensity as will be discussed, and thereby permit the use of higher voltages without breakdown across the narrow dimensions of the guide and between adjacent elements.

A principal object of the present invention is to provide a wave guide delay line structure having improved power capacity.

Another object of the present invention is to provide a wave guide delay line structure having improved voltage breakdown characteristics.

Another object of the invention is to provide a wave guide delay line structure comprising a series of capacitative irises having improved power capacity.

These and other objects will be apparent from the following discussion and figures, of which Figs. 1a, 1b, 2a, 2b and 4 are embodiments of wave guide delay structure illustration of the invention;

Derivation of formulae

Figure 1A:
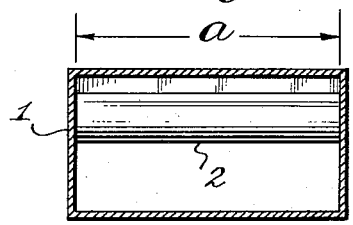
Figure 1B:
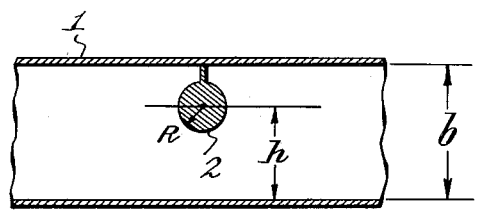
Figure 2A:
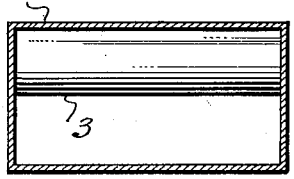
Figure 2B:
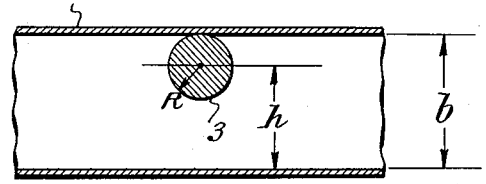

The power capacity of a loading structure in wave guide will now be considered, where, $P$=average power, watts.
$E$=peak field strength at center of the wave guide cross-section, volts/cm.
$V$=voltage from top to bottom at center of cross-section.
$\lambda$=space wavelength, cm.
$\lambda_g$=guide wavelength in uniform guide, cm.
$\lambda'_g$=loaded guide wavelength, cm.
$a,b$=long and short cross-section.
$Z_0$=characteristic impedance of uniform wave guide.
$Z_I$=image impedance of delay structure.
$y_I$=normalized image admittance.
$p$=loading factor, phase shift per loaded section=

$$\frac{\lambda_g}{\lambda'_g}$$

$K, K', K''$=constants.
$Ln=\log_e$

In uniform wave guide $$P = 6.63 \, (10)^{-4} \, ab \frac{\lambda}{\lambda_g} E^2 \qquad (1)$$

(See Moreno, Microwave Transmission Design Data, McGraw Hill, 1948, page 124.)
but,
$$V = Eb \qquad (2)$$
hence,
$$P = 6.63 \, (10)^{-4} \frac{a}{b} \frac{\lambda}{\lambda_g} V^2 = \frac{1}{2} \frac{V^2}{Z_0} \qquad (3)$$
where
$$Z_0 = 240 \, \pi \frac{b}{a} \frac{\lambda_g}{\lambda} \qquad (4)$$

In a loaded delay structure the power is given by
$$P = \frac{1}{2} \frac{V^2}{Z_I} = \frac{1}{2} \frac{V^2}{Z_0} \frac{Z_0}{Z_I} = \frac{1}{2} \frac{V^2}{Z_0} y_I \qquad (5)$$
where
$$y_I = \frac{Z_0}{Z_I} \qquad (6)$$

Hence in the delay structure
$$P = 6.63 \, (10)^{-4} \frac{a}{b} \frac{\lambda}{\lambda_g} y_I V^2 \qquad (7)$$

It is shown in my article "Analysis of metal strip delay structure" supra, that in the delay structure for $\lambda_g$ large,
$$y_I \approx p \qquad (8)$$
where $p$ is the loading factor defined as $$\frac{\lambda_g}{\lambda'_g}$$

i. e. the ratio of unloaded guide $\lambda$ to loaded guide $\lambda_g$. Typical values for $p$ are 1.1 to 1.4. Equation 8 may be used with Equation 7 in calculating the transmitted power.

For a given structure, there exists a proportional relationship between the maximum allowable voltage, $V_{max}$, and the breakdown field strength, $E_{max}$. Once $V_{max}$ has been determined, the breakdown power $P_{max}$ may then be calculated from Equation 7.

Two structures that are of practical interest will now be treated. Because of the difficulty involved in the exact solution of field problems, the physical configurations to be treated will be somewhat idealized, but due to the close similarity between the ideal and the actual structures, good results may be expected.

Breakdown voltage V of a single obstacle of circular cross-section will now be considered.

Figure 3:
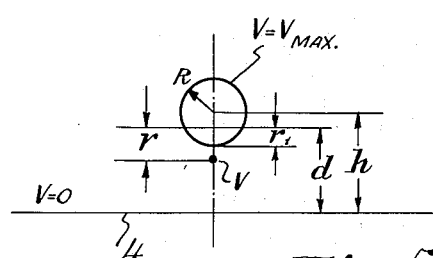
Fig. 3 is a diagram illustration of the theory of the invention.

Figures 1a, 1b, 2a, and 2b show side and cross-sectional views of structures consisting of rods 2 and 3 of circular cross-section, which might be used as elements in a delay line in wave guide 1. The maximum field strength occurs on the bottom surface of the rods. The field will undoubtedly be similar to the static distribution for a round rod and a ground plane 4 as shown in Fig. 3. (The assumption is made that the dimension $h$ is much smaller than $\lambda_g$.) The solution for this configuration Fig. 3 is well known. See Principles of Electricity and Magnetism by Page and Adams, Van Nostrand, 1931, p. 108.

The voltage of an equipotential surface is $$V = K Ln\left(\frac{2d-r}{r}\right) \quad (9)$$

The field strength is $$E = -\frac{dv}{dr} = K\left(\frac{1}{r} + \frac{1}{2d-r}\right) \quad (10)$$

On the conductor, $$K = \frac{E}{\frac{1}{r_1} + \frac{1}{2d-r_1}} = r_1\left(1 - \frac{r_1}{2d}\right)E$$

and, $$E = E_{max}$$

Hence, $$V_{max} = E_{max} r_1\left(1 - \frac{r_1}{2d}\right) Ln\left(\frac{2d-r_1}{r_1}\right) \quad (11)$$

The given dimensions are R and h (Fig. 3). In terms of these, $$r_1 = \left[\frac{\frac{h}{R} + \sqrt{\left(\frac{h}{R}\right)^2 - 1} - 1}{\frac{h}{R} + \sqrt{\left(\frac{h}{R}\right)^2 - 1}}\right] R \quad (12)$$

$$d = h - R + r_1 \quad (13)$$

For air under standard conditions, the field strength at which breakdown occurs is usually taken as $$E_{max} = 3(10)^4 \text{ volts/cm.} \quad (14)$$

$V_{max}$ may now be calculated from Equation 11, with the use of Equations 12, 13, and 14. $P_{max}$ may then be calculated by means of Equation 7.

Therefore, formulas are available for breakdown between a circular obstacle and the opposite wall of the wave guide.

Figure 4:
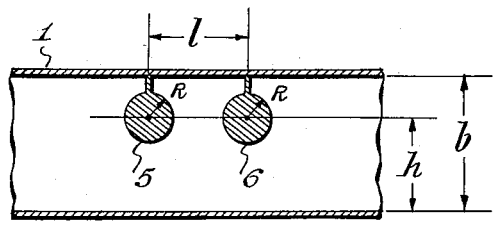

In a delay line a series of obstacles 5 and 6 are used, as in Fig. 4, and breakdown between adjacent obstacles is a possibility. Breakdown between obstacles of circular cross-section will now be considered.

For a matched delay line the complex voltage at the $n$th obstacle is $$V_n = V_0 e^{-j\beta_1 n} \quad (15)$$

where $\beta_1$ is the phase shift per filter section, and $V_0$ is the constant voltage magnitude. The voltage difference between obstacles $n$ and $n+1$ is $$V_n - V_{n+1} = V_0\left(e^{-j\beta_1 n} - e^{-j\beta_1(n+1)}\right)$$

$$= V_0 e^{-j\beta_1\left(n+\frac{1}{2}\right)}\left(e^{j\beta_1/2} - e^{-j\beta_1/2}\right)$$

$$= 2V_0 e^{-j\beta_1\left(n+\frac{1}{2}\right)} \sin\frac{\beta_1}{2}$$

Let $V' = |V_n - V_{n+1}|$, also $$\beta_1 = \frac{2\pi l}{\lambda_g} p$$

radians, where $p$ is the loading factor. Then $$V' = 2V_0 \sin\left(\frac{\pi l p}{\lambda_g}\right) \quad (16)$$

Now assume that the field between the circular obstacles is that of a two wire line. By image theory, this is equivalent to the case of a single line and a plane. Hence the solution for Figure 3 applies to 4 if $V'/2$ replaces $V$, and $l/2$ replaces $h$. Therefore, $$V'_{max} = 2E_{max} r_1\left(1 - \frac{r_1}{2d}\right) Ln\left(\frac{2d-r_1}{r_1}\right) \quad (17)$$

where $$r_1 = \left[\frac{\frac{l}{2R} + \sqrt{\left(\frac{l}{2R}\right)^2 - 1} - 1}{\frac{l}{2R} + \sqrt{\left(\frac{l}{2R}\right)^2 - 1}}\right] R \quad (18)$$

$$d = \frac{l}{2} - R + r_1 \quad (19)$$

The power relation for breakdown between obstacles is obtained from Equations 7 and 16

$$P'_{max} = \frac{1.66(10)^{-4} \frac{a}{b} \frac{\lambda}{\lambda_g} y_I (V'_{max})^2}{\sin^2(\beta_1/2)} \quad (20)$$

$P'_{max}$ may now be calculated from Equations 17 and 20.

In calculating breakdown of a delay line composed of obstacles of circular cross-section, both $P_{max}$ and $P'_{max}$ should be evaluated. The breakdown power for the line is then equal to the lesser of these two.

It has been shown that capacity loaded delay lines may be designed by using a series of capacitative irises in a wave guide. However, the sharp corners of the irises cause a poor voltage breakdown characteristic. The voltage breakdown and power characteristics of the iris may be improved by making the iris thicker so as to provide a larger radius of curvature at their open ends. However, this added thickness is an undesirable feature which effectively reduces the inductance and therefore the delay in the wave guide. The reason for this is as follows:

One section of the loaded line may be considered as a $\pi$ filter section. The inductance of the filter section at frequencies near guide cutoff frequency, is $$L_F = \frac{\text{Total area} - \text{Obstacle area}}{\text{Total area}} L$$

where L is the inductance without obstacles. The area is in the plane determined by the electric field and the longitudinal axis of the guide. Therefore, the addition of thick plates tends to reduce the inductance, which is undesirable since the velocity of propagation $V_p$ is proportional to $$\frac{1}{\sqrt{LC}}$$

The present invention keeps the iris plates thin and minimizes voltage breakdown by adding the rod members.

Figure 5:
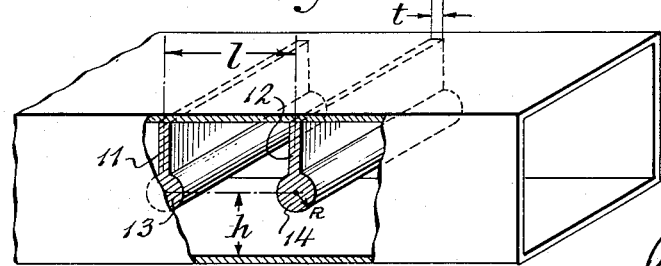
Fig. 5 is an illustration of a preferred embodiment of the invention.

In the preferred embodiment of the present invention shown in Fig. 5, thin irises 11 and 12 are used, and they are terminated with rod-like members 13 and 14 which provide the desired improved voltage breakdown characteristic, and therefore permit the use of greater power. The embodiment of Fig. 5 has been found preferable in a particular instance to the structures of Figs. 1, 2 and 3.

The specific embodiment of Fig. 5 was designed for a frequency of approximately 4600 megacycles having the following values, where the wave guide inside dimensions are 1.372"×.622";

$l = .426"$
$2R = .234"$
$h = .378"$
$t = .015"$

On testing, it was found to have a loading factor $p$ of 1.34.

Figure 6A:
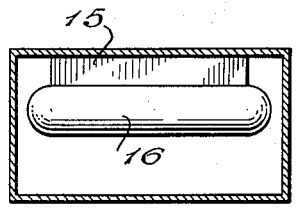
Figs. 6a, 6b, 7a, 8a and 8b, are illustrations of other embodiments of the invention.
Figure 6B:
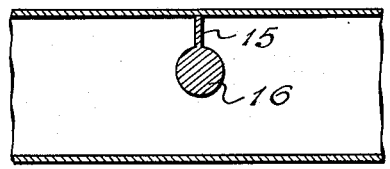
Figure 7A:
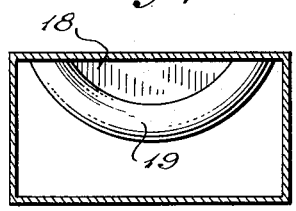
Figure 7B:
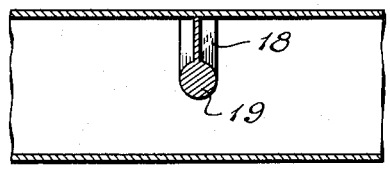
Figure 8A:
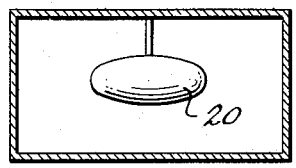
Figure 8B:
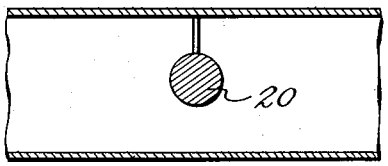

The obstacles need not extend entirely across the guide nor do they have to be parallel although in such cases the cutoff frequency may be effected. Fig. 6 shows a structure having a plate 15 and rod member 16 which do not extend completely across the guide. Fig. 7 shows a plate 18 of general semicircular shape which is terminated in a curved rod member 19. The obstacles need not even be plates but may be spherical or oval in shape as shown in Fig. 8 which shows the obstacle 20 having an oval shape.

Many changes, for instance, of dimensions or of variations in the orientation of the structures may be made without departing from the scope of the invention.

What is claimed is:

An ultra high frequency delay line for operation at high power, said line comprising a hollow rectangular wave guide having a pair of parallel narrow walls and a pair of parallel broad walls, a series of very thin flat conductive plates, the plates being perpendicular to the walls of the wave guide and being positioned within the wave guide with equal spacings between adjacent plates, each of the plates being substantially rectangular in outline and secured along three edges thereof to the two narrow walls and one of the broad walls with the remaining edge of each plate being spaced from the other of the broad walls, and a circular rod member extending between the narrow walls adjacent each of the plates and positioned in said space between the broad wall and said remaining edge of the corresponding plate, each of the rod members having the longitudinal axis thereof lying in the plane defined by the flat surface of the corresponding plate and being conductively joined to the corresponding plate along said remaining edge of the plate, the diameter of the rod members being appreciably greater than the thickness of the plates and of a size order several times greater than the plate thickness to thereby increase the loading capacity and inductance while reducing voltage breakdown at the free edges of the plates.

References Cited in the file of this patent
UNITED STATES PATENTS

| | | |
|---|---|---|
| 1,387,389 | Haberli et al. | Aug. 9, 1921 |
| 1,628,438 | Simons | May 10, 1927 |
| 1,730,136 | Haller | Oct. 1, 1929 |
| 2,398,162 | Sloan | Apr. 9, 1946 |
| 2,518,092 | Sunstein et al. | Aug. 8, 1950 |
| 2,540,488 | Mumford | Feb. 6, 1951 |
| 2,567,748 | White | Sept. 11, 1951 |
| 2,607,850 | Fox | Aug. 19, 1952 |

OTHER REFERENCES

Publication I: "Microwave Transmission Circuits" edited by Ragan, vol. 9 of Radiation Laboratory Series, published by McGraw-Hill, May 21, 1948; pp. 211–216, 235, 241 and 534. (Copy in Div. 69.)

Publication II: "Technique of Microwave Measurements" edited by Montgomery, vol. 11 of Radiation Laboratory Series, published by McGraw-Hill, May 11, 1948; page 739. (Copy in Div. 69.)